3,517,091
METHOD OF MAKING DENTAL PARTS
Irving A. Ellman, Auerbach Lane,
Lawrence, N.Y. 11559
No Drawing. Filed Mar. 27, 1967, Ser. No. 625,969
Int. Cl. B29c *1/02, 1/04;* A61c *13/00*
U.S. Cl. 264—16                                    8 Claims

ABSTRACT OF THE DISCLOSURE

A method in dental restoration for making a dental model in which the mold surfaces of a stone model are soaked in a low viscosity epoxy solution to impregnate the pores thereof, and then the epoxy hardened to form in effect an epoxy model integral and precisely coextensive with the stone which forms a network filler within it. The resultant model has very hard mold surfaces with excellent resistance to indentation and abrasion and will not soften when wet.

---

This invention relates to a method of making dental parts such as inlays, crowns, bridges, dentures and the like, and in particular to the model making part of the method. As is well known, the prevailing technique for dental restoration begins with the dentist taking an impression in wax, rubber, silicone, alginate or like materials of the patient's tooth or gum involved in the restoration. From the resulting impression is cast a dental stone model. Dental stone is a form of gypsum like plaster of paris. It is mixed with water and cast inside the impression, and when hardened forms a positive life-size model whose mold surfaces constitute a clear and accurate reproduction of the patient's oral cavity or portion thereof involved. From the stone model are then constructed the restorations required, and for this purpose various kinds of materials are brought into contact with the model mold surfaces and later removed. A number of difficulties are encountered in this known process. The stone is naturally porous; as a result materials brought into contact with it have a tendency to stick to the surface making it difficult to remove the material without damaging it or the model. The stone model is weak and easily broken. Indentations are easily made in the surface and the stone material easily abrades, both of which cause the model surfaces to lose their accuracy. Prior art attempts to solve this problem include providing a metallic or foil liner on the model. This was, of course, cumbersome and not a satisfactory solution. In addition, there was a loss in accuracy due to the thickness of the foil liner. Other attempted solutions included the use of borax, soap and shellacs to harden the mold surfaces, but the resultant molds still became soft when wet and exhibited poor abrasion resistance. Other efforts involved modifying the stone composition to reduce its porosity.

My improved method is superior to all of the known techniques and results in a model having very hard surfaces, excellent resistance to abrasion and indentation, and will not soften when wet. It is based on the concept of making the model out of an epoxy resin. However, casting an epoxy directly into the wax or alginate impression material, while it will produce a hard model of excellent strength, will not result in an accurate model because of the shrinkage of the epoxy that takes place during hardening. The basis of my invention is to retain the accurate reproducing ability of the dental stone, and to use the epoxy to convert the stone die into and epoxied die. In accordance with my invention, I first form an accurate reproduction of the impression material by investing it with a dental stone that when hardened is porous. I then impregnate the porous stone model with a low viscosity epoxy solution without altering the accuracy of the die or model surfaces, and then I harden the epoxy. The epoxy hardens into a solid block having within it as a filler the stone network which ensures that the final contours of the epoxied stone model retains the accuracy of the original stone.

A preferred method for carrying out my invention is as follows. After the original stone model is formed in the conventional way, I allow it to thoroughly dry to ensure that all excess water is removed from its pores leaving them free to soak up the epoxy solution. Overnight drying of a stone model poured the previous day will be sufficient. If the stone model was just poured, it should be preheated under a heat lamp for about 5 minutes to drive out excess water. I then prepare the epoxy solution, as will be described in greater detail hereinafter, and apply the solution to the stone die surfaces, for example, by painting it on with a brush or using a cotton pellet to apply it freely. Generally the first coating will be readily absorbed leaving a dull surface, and I find it desirable to apply a second, third or more coats to saturate the die until an excess of epoxy remains at the surface giving a glossy appearance. I then allow the coating to continue to soak into the stone at room temperature for about 5 minutes to ensure maximum penetration. Next, I carefully remove the excess epoxy solution remaining, for example, by blowing away the excess with an air syringe and then wiping the die surfaces with cotton roll or facial tissue. This is important to ensure that no excess surface coating remains which would add thickness to the die and impair its accuracy. Any excess epoxy which may have gelled can be removed with a suitable solvent such as toluene.

I then harden the epoxy. The preferred epoxy formulations which will be later described will bench cure hard at room temperature overnight. To obtain faster curing, the epoxied die should be allowed to remain on the bench for at least about 15 minutes until the epoxy begins to gel, which means that the solvents used to reduce its viscosity to enable the epoxy solution to thoroughly impregnate the stone die will have evaporated. Otherwise, if heat is applied immediately, the epoxy solution may percolate producing a rough granular coating on the die surface. After bench gelling, the die is heated for about 40 minutes at a temperature of about 200° F. For this I prefer to use an open heat lamp, for example, a 250 watt infra-red lamp placed about 4 inches from the die. A closed oven is not recommended because of the flammable nature of the solvents. After the heat treatment, the die can be lubricated and waxed up. Final hardness will be developed in about one hour at room temperature. Even before final hardness is achieved, the wax-ups will not stick and can be removed without cracking due to the fact that the die pores are filled. After final hardness, the finished castings can be fitted and polished on the completely hardened die.

I have examined the hardened epoxied die and it appears to be a solid block of epoxy, and this accounts for its high strength, excellent resistance to abrasion, indentation, and water. It does not soften when wet. However, no loss in accuracy of the die surfaces occurs because the original stone forms a network or skeleton that acts as a filler throughout the epoxy that ensures that the original die contours remain and are not altered or distorted.

The resins which I prefer to use in my invention are the unmodified liquid aromatic diepoxides such as Epon 815 (available from Shell Chemical Corp.), ERL 2795 (available from Bakelite Co.), Araldite 502 (available from Ciba Co.), and Epi-Rez 504 (available from Jones-Dabney Co.) because of their low viscosity and high strength. However, the viscosity of these resins when combined with the hardener is still too high for adequate impregnation of the stone model. I therefore blend into the resin solution a suitable volatile diluent in not excessive concentration in order not to reduce unduly the strength of the cured resin, but sufficient to reduce the viscosity of the resin-hardener solution to the desired low level. The best diluents I have found for this purpose are the aromatic solvents for the resin, such as toluene and xylene. I have found that toluene gives the best results. It reduces the viscosity of the resin as obtained from the manufacturer to a low enough level to enable the resin-hardener solution to penetrate the die quickly and thoroughly. The toluene rapidly evaporates from the impregnated die with the result that no loss of strength of the epoxy occurs. This is important because the epoxy content of the hardened die is small and any significant loss of strength would not enable the desired results to be attained. Ketone diluents, such as acetone, while usable, do not give as good results because they oxidize amines, which are used to harden the epoxy. Ethers is another class of usable diluents. As hardeners for the resin, I prefer to use the aliphatic amines, the primary and secondary amines, such as tetraethylenepentamine, triethylenetetramine, diethylenetriamine or mixtures thereof. With these hardeners, overnight curing at room temperature is obtained. Faster curing is readily obtained by a short bake at about 200° F. Where the toxicity of these hardeners is undesirable, because of possible allergic reactions in the user, hydroxyethyl polyamines can be substituted. One suitable formulation is as follows. I blend with a hardener such as tetraethylenepentamine, toluene in the proportions of about 12 parts by volume of the hardener to about 88 parts of the diluent. To prepare the epoxy solution, which is only mixed just before use, I then mix about 100 parts by volume of a resin such as Epon 815 with about 92 parts of the tetraethylenepentamine-toluene mix. Should the toluene evaporate from the hardener mix after some time, the low viscosity can be restored by adding more toluene.

A faster-hardening formulation, which I prefer, was made as follows: The resin, in this case Epon 815, was again undiluted. The thinner was added to the hardener. It comprised 25% by volume tetraethylenepentamine and 75% toluene. Equal amounts by volume of the resin and hardener solution were mixed just before use, and the resultant low viscosity solution applied to the stone die. The resultant solution contained about 15 parts per hundred of the hardener to the combined amounts of the resin and the thinner producing a fast-drying, well-hardened epoxy.

It will be clear to those skilled in the art there are many possible formulations of the resin as well as many possible hardeners for the resin that will perform satisfactorily in my new method. A major requirement to be satisfied is a sufficiently low viscosity for the resin solution to obtain complete impregnation of the stone model. The viscosity of most resins is not sufficiently low to satisfy this requirement, and the solution tends to gel on the surface preventing complete impregnation. I prefer to satisfy this requirement using volatile thinners which can be readily evaporated after impregnation so as not to impair the strength of the hardened epoxy. For the specific epoxies mentioned, the thinner content will generally constitute 25-60% by volume of the combined mix. Another important requirement for best results is fast hardening, and to satisfy this I prefer to use a hardener content of at least about 10%. It is also important, of course, that the epoxy used bonds strongly to the stone skeleton, which applies to many common epoxies, and that a very hard model is finally obtained to match as closely as possible the hard enamelled tooth surfaces, which I achieve with the resins mentioned.

While I have described my invention in connection with specific embodiments and applications, other modifications thereof will be readily apparent to those skilled in this art without departing from the spirit and scope of the invention as defined in the appended claims.

What is claimed is:

1. In a dental restoration method in which a model is formed from an impression of a patient's oral cavity or portions thereof, the improvement comprising the steps of forming an accurate model of dental stone which when hardened is porous, applying to the model surfaces plural coatings of a low viscosity liquid epoxy-hardener solution containing sufficient content of a volatile solvent to reduce the viscosity of the solution to a value low enough to enable it to thoroughly impregnate the stone model until an excess of solution remains on the surface, removing the solution excess remaining on the surfaces, then subjecting the impregnated stone model to a treatment to harden the epoxy without percolating the solution, and then using the hardened epoxy-stone model to produce the restoration required.

2. A method as set forth in claim 1 wherein the solvent content of the epoxy solution is between 25–60% by volume of the solution.

3. A method as set forth in claim 1 wherein the epoxy resin is an unmodified aromatic diepoxide.

4. A method as set forth in claim 1 wherein the hardener is an aliphatic amine.

5. A method as set forth in claim 1 wherein the solvent is an aromatic solvent.

6. A method as set forth in claim 5 wherein the solvent is toluene.

7. A method as set forth in claim 1 wherein the hardener content of the solution exceeds 10%.

8. A method as set forth in claim 2 wherein, before applying the epoxy the stone model is dried to remove all excess water, the epoxy solution excess is removed from the stone model surfaces by wiping them with a soft material, and the hardened model is used by fitting and polishing on the model a casting to produce the restoration required.

References Cited

UNITED STATES PATENTS

| | | | |
|---|---|---|---|
| 1,665,355 | 4/1928 | Gustafson | 264—338 |
| 2,228,059 | 1/1941 | Lee | 264—338 |
| 2,341,593 | 2/1944 | Burkhardt | 264—16 |
| 2,414,093 | 1/1947 | Cole et al. | 264—338 |
| 2,528,219 | 10/1950 | Feagin | 264—338 |
| 3,077,005 | 2/1963 | Sokol | 264—338 |
| 3,167,521 | 1/1965 | Heckmaier et al. | 264—338 |
| 3,251,909 | 5/1966 | Pickands et al. | 264—338 |
| 2,809,184 | 10/1957 | Langer | 117—123 |
| 3,220,878 | 11/1965 | Pines | 117—123 |
| 3,305,387 | 2/1967 | Fraser et al. | 117—123 |

JULIUS FROME, Primary Examiner

A. H. KOECKERT, Assistant Examiner

U.S. Cl. X.R.

117—123; 264—222, 338